(12) United States Patent
Laaksonen et al.

(10) Patent No.: US 11,210,518 B2
(45) Date of Patent: Dec. 28, 2021

(54) APPARATUS AND ASSOCIATED METHODS FOR DISPLAY OF VIRTUAL REALITY CONTENT

(71) Applicant: Nokia Technologies Oy, Espoo (FI)

(72) Inventors: Lasse Laaksonen, Tampere (FI); Miikka Vilermo, Siuro (FI); Mikko Tammi, Tampere (FI); Arto Lehtiniemi, Lempaala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 85 days.

(21) Appl. No.: 16/623,112

(22) PCT Filed: May 31, 2018

(86) PCT No.: PCT/FI2018/050413
§ 371 (c)(1),
(2) Date: Dec. 16, 2019

(87) PCT Pub. No.: WO2019/002664
PCT Pub. Date: Jan. 3, 2019

(65) Prior Publication Data
US 2020/0175274 A1    Jun. 4, 2020

(30) Foreign Application Priority Data
Jun. 29, 2017   (EP) ..................................... 17178581

(51) Int. Cl.
*G06K 9/00* (2006.01)
*G06T 7/73* (2017.01)
(Continued)

(52) U.S. Cl.
CPC .......... *G06K 9/00671* (2013.01); *G06F 3/011* (2013.01); *G06F 16/538* (2019.01); *G06T 7/74* (2017.01); *G06T 19/006* (2013.01)

(58) Field of Classification Search
CPC ..... G06K 9/00671; G06T 7/74; G06T 19/006; G06F 16/538; G06F 3/011
See application file for complete search history.

(56) References Cited

U.S. PATENT DOCUMENTS

2009/0222424 A1 * 9/2009 Van .................... G06Q 30/0277
2009/0271369 A1    10/2009 Cheng et al.
(Continued)

FOREIGN PATENT DOCUMENTS

| WO | 2017/005966 A1 | 1/2017 |
| WO | 2017/125643 A1 | 7/2017 |

OTHER PUBLICATIONS

Office action received for corresponding Indian Patent Application No. 201947052121, dated Mar. 22, 2021, 8 pages of office action.
(Continued)

*Primary Examiner* — Michelle L Sams
(74) *Attorney, Agent, or Firm* — Alston & Bird LLP

(57) ABSTRACT

An apparatus configured: based on a point of interest identified in one or more instances of virtual reality content comprising at least visual imagery and data to provide a virtual reality space in which the visual imagery is displayed; and based on context information for at least one of the instances of the virtual reality content, the context information defining the extent of a virtual sub-volume of the virtual reality space that includes the point of interest; to provide for display of a virtual-reality-content-review-space to a user comprising a space in which a VR preview of the instances of virtual reality content is displayed at a location spaced from a point of view of the user, the or each VR preview comprising the respective sub-volume defined by the context information for providing the user with an understanding of the virtual reality space around the point of interest.

20 Claims, 5 Drawing Sheets

(51) Int. Cl.
   *G06F 16/538*   (2019.01)
   *G06F 3/01*     (2006.01)
   *G06T 19/00*    (2011.01)

(56) References Cited

U.S. PATENT DOCUMENTS

| | | |
|---|---|---|
| 2010/0241525 A1 | 9/2010 | Aguera Y Arcas et al. |
| 2012/0303660 A1 | 11/2012 | Betzler et al. |
| 2016/0163063 A1* | 6/2016 | Ashman ............ G06T 7/20 |
| | | 345/633 |
| 2016/0292273 A1 | 10/2016 | Murphy et al. |
| 2017/0323481 A1* | 11/2017 | Tran ............ G06K 9/00771 |

OTHER PUBLICATIONS

"Sony's 'Joshua Bell VR Experience' on PSVR is Among the Best VR Video You'll Find on Any Headset", Roadtovr, Retrieved on Dec. 5, 2019, Webpage available at : https://www.roadtovr.com/now-psvr-sonys-joshua-bell-vr-experience-among-best-vr-video-youll-find-headset/.

Extended European Search Report received for corresponding European Patent Application No. 17178581.9, dated Nov. 9, 2017, 10 pages.

International Search Report and Written Opinion received for corresponding Patent Cooperation Treaty Application No. PCT/FI2018/050413, dated Aug. 8, 2018, 15 pages.

* cited by examiner

Figure 10

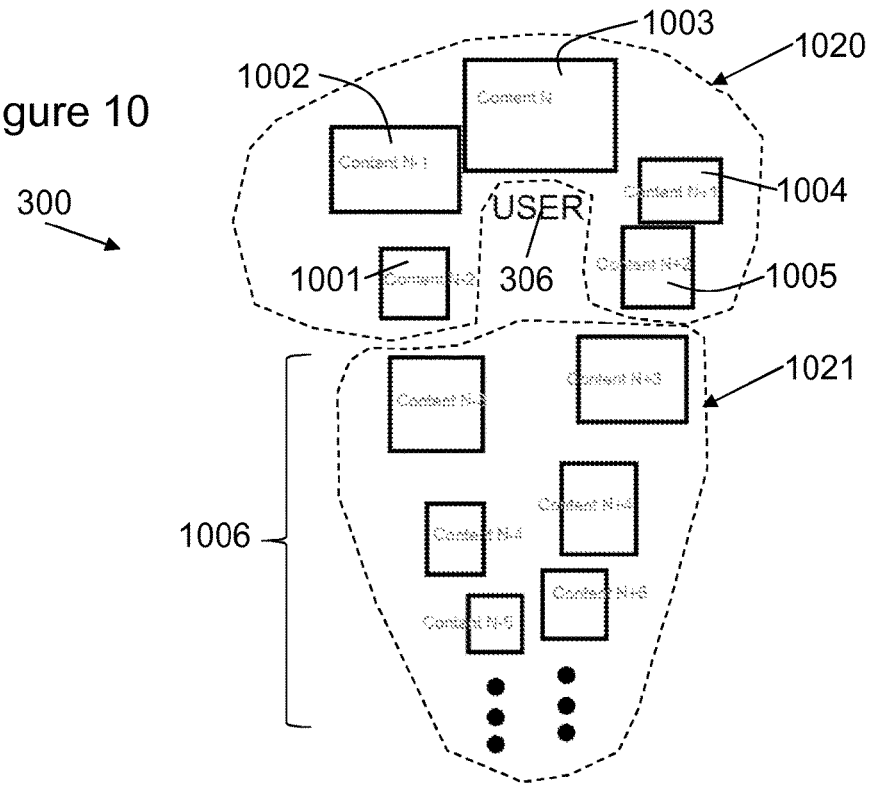

Figure 11

| 1101 | based on a point of interest being identified in one or more instances of virtual reality content, the one or more instances of virtual reality content each comprising at least visual imagery to provide a virtual reality space in which the visual imagery is displayed; and based on context information for each instance of the virtual reality content, the context information defining the extent of a virtual sub-volume of the virtual reality space that includes the point of interest |
|---|---|
| 1102 | providing for display of a VR-content-review-space to a user, the VR-content-review-space comprising a virtual space in which a VR preview of the at least one instance of virtual reality content is displayed at a location spaced from a point of view of the user, each VR preview comprising the respective sub-volume defined by the context information for providing the user with an understanding of the virtual reality space around the point of interest |

Figure 12

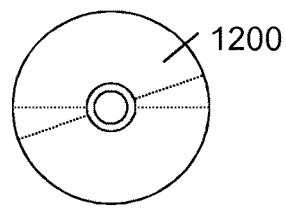

APPARATUS AND ASSOCIATED METHODS FOR DISPLAY OF VIRTUAL REALITY CONTENT

RELATED APPLICATION

This application was originally filed as PCT Application No. PCT/FI2018/050413, filed on May 31, 2018, which claims priority from EP Application No. 17178581.9, filed on Jun. 29, 2017.

TECHNICAL FIELD

The present disclosure relates to the field of virtual reality, in particular, to the display, for selection, of instances of virtual reality content. It also relates to associated methods, computer programs and apparatus.

BACKGROUND

The availability of virtual reality content is increasing. The virtual reality content may be of various objects and places, be of different genres or relate to different topics. The effective browsing and/or selection of virtual reality content for a user to experience from a plurality of instances of virtual reality content options may be challenging.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising:
  at least one processor; and
  at least one memory including computer program code,
  the at least one memory and the computer program code configured to, with the at least one processor, cause the apparatus to perform at least the following:
  based on a point of interest being identified in one or more instances of virtual reality content, the one or more instances of virtual reality content each comprising at least visual imagery and data to provide a virtual reality space in which the visual imagery is displayed; and
  based on context information for at least one instance of the virtual reality content, the context information defining the extent of a virtual sub-volume of the virtual reality space that includes the point of interest;
  provide for display of a virtual-reality-content-review-space to a user, the virtual-reality-content-review-space comprising a virtual space in which a virtual reality preview of the one or more instances of virtual reality content is displayed at a location spaced from a point of view of the user, the or each virtual reality preview comprising the respective sub-volume defined by the context information for providing the user with a view of the virtual reality space around the point of interest.

In one or more examples, the virtual reality previews provide the user with a view that allows for understanding of the virtual reality space around the point of interest. In one or more examples, the virtual-reality-content-review-space is provided for display in one of virtual reality and augmented reality. Thus, the virtual reality previews may be presented overlaid over a view of the real world in augmented reality, or the virtual reality previews may be presented in a virtual-reality-content-review-space in virtual reality.

In one or more embodiments, the sub-volume comprises an amount of the virtual reality space of each instance of virtual reality content to distinguish surroundings of the point of interest in the sub-volume from surroundings of the point of interest in the sub-volume of any other of the one or more instances of virtual reality content.

In one or more examples, the context information is configured to define the sub-volume such that it includes at least one feature in the visual imagery of the virtual reality content at a virtual location around said point of interest to provide an indication of the virtual surroundings of the point of interest.

In one or more examples, the virtual reality content is six degrees of freedom (6DoF) content.

In one or more examples, the context information defines one or more of:
  i) dimensions of the sub-volume that includes the point of interest;
  ii) a virtual distance from the point of interest to a feature in visual imagery of the instance of virtual reality content, the virtual distance relative to the point of interest providing for definition of the sub-volume;
  ii) an identifier of at least one feature in the visual imagery of the instance of virtual reality content, wherein the sub-volume includes the point of interest and the identified feature.

In one or more embodiments, the context information is one or more of:
  i) predefined and associated with the virtual reality content, the context information providing information to define the sub-volume associated with one or more points of interest that feature in said virtual reality content;
  ii) generated from computer content analysis configured to identify the location of the point of interest in said virtual reality space of said instance of virtual reality content and define the sub-volume therearound to provide the user with an understanding of the virtual reality space around the point of interest; and
  iii) generated, at least in part, from user-settings that specify the size of the sub-volume for the point of interest.

In one or more embodiments, the context information is specific to the point of interest and to its surroundings in the respective instance of virtual reality content.

In one or more embodiments, the context information defines an associated nearby feature in the virtual reality content, the sub-volume defined such that it includes the point of interest and the associated nearby feature, the associated nearby feature comprising a predetermined feature in the visual imagery of the instance of virtual reality content at a virtual location around said point of interest to provide an indication of the virtual surroundings of the point of interest.

In one or more embodiments, the one or more instances of virtual reality content comprises search results of a search query, the search query performed on a plurality of instances of virtual reality content that include the one or more instances of virtual reality content, the point of interest comprising the subject of a search query from which said search results were generated.

In one or more examples, the point of interest comprises one or more of an object, location or occurrence featured in imagery of said virtual reality (VR) content.

In one or more examples, the VR preview comprises the spatial sub-volume of the whole VR space defined by the instance of VR content and a temporal subset of a period of time covered by the instance of VR content.

In one or more examples, the point of interest is provided for display substantially at the centre of the sub-volume.

In one or more embodiments, a plurality of virtual reality previews of instances of virtual reality content are provided for display in the virtual-reality-content-review-space, the virtual reality previews each displayed at a location spaced from a point of view of the user and at least partially surrounding the point of view of the user.

In one or more embodiments, the relative size of each of the virtual reality previews relative to the other virtual reality previews provided for display is defined by the size of the virtual sub-volume defined by the context information for each instance of virtual reality content.

In one or more embodiments, at least two virtual reality previews are provided for display, a first virtual reality preview and a second virtual reality preview and wherein one or more of:
  i) the first virtual reality preview is located to the side of the second virtual reality preview in the virtual-reality-content-review-space from the point of view of the user and the virtual sub-volume of the first virtual reality preview and virtual sub-volume of the second virtual reality preview overlap one another;
  ii) the virtual sub-volume of the first virtual reality preview and virtual sub-volume of the second virtual reality preview are non-overlapping;
  iii) the first virtual reality preview is located in front of the second virtual reality preview in the virtual-reality-content-review-space from the point of view of the user and the first virtual reality preview is displayed with at least partial transparency to provide for viewing of the second virtual reality preview through the first virtual reality preview;
  iv) the first virtual reality preview is located in front of the second VR preview in the virtual-reality-content-review-space from the point of view of the user thereby hiding the second virtual reality preview from view, wherein based on user-input the second virtual reality preview is made visible to the user.

In one or more embodiments, based on a user input to move their point of view in the virtual-reality-content-review-space to a position within the sub-volume of a particular one of the virtual reality previews, provide for one or more of:
  i) presentation of at least a temporal sub-section of the instance of virtual reality content associated with the particular virtual reality preview, at least a portion of the temporal section featuring the point of interest;
  ii) presentation of the instance of virtual reality content associated with the particular virtual reality preview in virtual reality;
  iii) presentation of a larger volume of the virtual reality space than that defined by the sub-volume;
  iv) removal from display of the virtual reality previews other than the particular virtual reality preview.

In one or more embodiments, the one or more virtual reality previews comprise one or more of:
  i) substantially cuboid-shaped sub-volumes;
  ii) substantially spherical-shaped sub-volumes; and
  iii) substantially sectorial-shaped sub-volumes.

In one or more embodiments, the one or more virtual reality previews are provided for display such that each virtual reality preview comprises a window through which the sub-volumes are viewed and wherein the virtual reality previews are provided with a substantially fixed orientation relative to the user and the sub-volumes of virtual reality space and the point of interest therein are rotated.

In one or more embodiments, the one or more virtual reality previews are provided for display in one or more of the following configurations:
  i) in a plane surrounding the point of view of the user;
  ii) in at least two planes, a first of the planes arranged substantially horizontally and surrounding the point of view of the user and the second of the planes arranged substantially horizontally and above or below the point of view of the user, spaced from the first plane;
  iii) in a plurality of sectors that converge at the point of view of the user;
  iv) in a first tier comprising a plurality of sectors that converge at the point of view of the user and a second tier comprising a plurality of sectors arranged in a ring that is substantially centred at the point of view of the user;
  v) at spaced points along a spiral that spirals around the point of view of the user.

In a second aspect there is provided a method, the method comprising
  based on a point of interest being identified in one or more instances of virtual reality content, the one or more instances of virtual reality content each comprising at least visual imagery to provide a virtual reality space in which the visual imagery is displayed; and based on context information for at least one instance of the virtual reality content, the context information defining the extent of a virtual sub-volume of the virtual reality space that includes the point of interest;
  providing for display of a virtual-reality-content-review-space to a user, the virtual-reality-content-review-space comprising a virtual space in which a virtual reality preview of the at least one instance of virtual reality content is displayed at a location spaced from a point of view of the user, the or each virtual reality preview comprising the respective sub-volume defined by the context information for providing the user with a view of the virtual reality space around the point of interest.

In a third aspect there is provided a computer readable medium comprising computer program code stored thereon, the computer readable medium and computer program code being configured to, when run on at least one processor, perform the method of:
  based on a point of interest being identified in one or more instances of virtual reality content, the one or more instances of virtual reality content each comprising at least visual imagery to provide a virtual reality space in which the visual imagery is displayed; and based on context information for at least one instance of the virtual reality content, the context information defining the extent of a virtual sub-volume of the virtual reality space that includes the point of interest;
  providing for display of a virtual-reality-content-review-space to a user, the virtual-reality-content-review-space comprising a virtual space in which a virtual reality preview of the at least one instance of virtual reality content is displayed at a location spaced from a point of view of the user, the or each virtual reality preview comprising the respective sub-volume defined by the context information for providing the user with a view of the virtual reality space around the point of interest.

In a further aspect there is provided an apparatus, the apparatus comprising means configured to;
- based on a point of interest being identified in one or more instances of virtual reality content, the one or more instances of virtual reality content each comprising at least visual imagery to provide a virtual reality space in which the visual imagery is displayed; and based on context information for at least one instance of the virtual reality content, the context information defining the extent of a virtual sub-volume of the virtual reality space that includes the point of interest;
- provide for display of a virtual-reality-content-review-space to a user, the virtual-reality-content-review-space comprising a virtual space in which a virtual reality preview of the at least one instance of virtual reality content is displayed at a location spaced from a point of view of the user, the or each virtual reality preview comprising the respective sub-volume defined by the context information for providing the user with a view of the virtual reality space around the point of interest.

The present disclosure includes one or more corresponding aspects, examples or features in isolation or in various combinations whether or not specifically stated (including claimed) in that combination or in isolation. Corresponding means and corresponding functional units (e.g., function enabler, AR/VR graphic renderer, display device) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which:

FIG. 10 shows a view of a VR-content-review-space with an eighth example configuration FIG. 11 shows a flowchart illustrating an example method; and FIG. 12 shows a computer readable medium.

DESCRIPTION OF EXAMPLE ASPECTS

Figure 1:
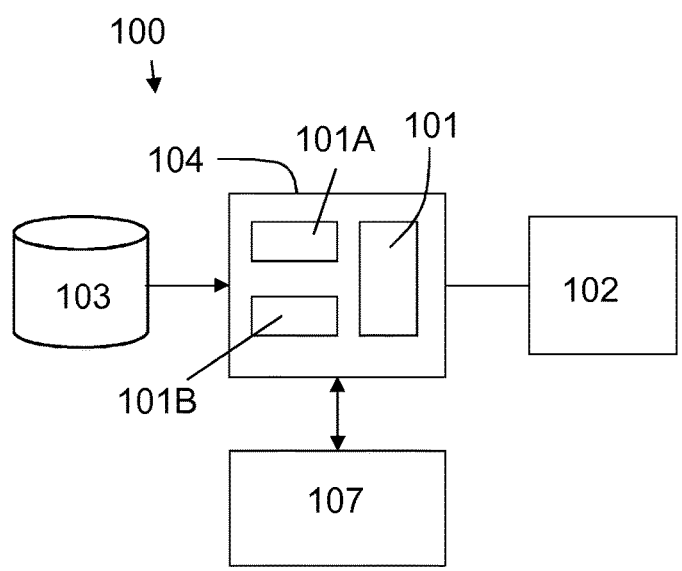
FIG. 1 illustrates an example apparatus for providing for display of a VR-content-review-space to a user.

Virtual reality (VR) may use a VR display comprising a headset, such as glasses or goggles or virtual retinal display, or one or more display screens that surround a user to provide the user with an immersive virtual experience. A virtual reality apparatus, which may or may not include the VR display, may provide for presentation of multimedia VR content representative of a virtual reality scene to a user to simulate the user being present within the virtual reality scene. Accordingly, in one or more examples, the VR apparatus may provide signalling to a VR display for display of the VR content to a user while in one or more other examples, the VR apparatus may be part of the VR display, e.g. part of the headset. The virtual reality scene may therefore comprise the VR content displayed within a three-dimensional virtual reality space so that the user feels immersed in the scene, as if they were there, and may look around the VR space at the VR content displayed around them. The virtual reality scene may replicate a real world scene to simulate the user being physically present at a real world location or the virtual reality scene may be computer generated or a combination of computer generated and real world multimedia content. Thus, the VR content may be considered to comprise the imagery (e.g. static or video imagery), audio and/or accompanying data from which a virtual reality scene may be generated for display. The VR apparatus may therefore provide the VR scene by generating the virtual, three-dimensional, VR space in which to display the VR content. The virtual reality scene may be provided by a panoramic video (such as a panoramic live broadcast), comprising a video having a wide or 360° field of view (or more, such as above and/or below a horizontally oriented field of view, sometimes known as 360°×360°). A panoramic video may have a wide field of view in that it has a spatial extent greater than a field of view of a user or greater than a field of view with which the panoramic video is intended to be displayed.

The VR content provided to the user may comprise live or recorded images of the real world, captured by a VR content capture device, for example. An example VR content capture device comprises a Nokia Technologies OZO device. As the VR scene is typically larger than a portion a user can view with the VR display, the VR apparatus may provide, for display on the VR display, a virtual reality view of the VR scene to a user, the VR view showing only a spatial portion of the VR content that is viewable at any one time. The VR apparatus may provide for panning around of the VR view in the VR scene based on movement of a user's head and/or eyes. A VR content capture device may be configured to capture VR content for display to one or more users. A VR content capture device may comprise one or more cameras and, optionally, one or more (e.g. directional) microphones configured to capture the surrounding visual and aural scene from a capture point of view. In some examples, the VR content capture device comprises multiple, physically separate cameras and/or microphones. Thus, a musical performance may be captured (and recorded) using a VR content capture device, which may be placed on stage, with the performers moving around it or from the point of view of an audience member. In each case a consumer of the VR content may be able to look around using the VR display of the VR apparatus to experience the performance at the capture location as if they were present.

The virtual reality content may comprise, and a VR apparatus presenting said VR content may provide, pre-defined-viewing-location VR or free-viewing-location VR. In predefined-viewing-location VR, the location of the user in the virtual reality space may be fixed or follow a pre-defined path. Accordingly, a user may be free to change their viewing direction with respect to the virtual reality imagery provided for display around them in the virtual reality space, but they may not be free to arbitrarily change their viewing location in the VR space to explore the VR space. Thus, the user may experience such VR content from a fixed point of view or viewing location (or a limited number of locations based on where the VR content capture devices were located in the scene). In some examples of predefined-viewing-location VR the imagery may be considered to move past them. In predefined-viewing-location VR content captured of the real world, the user may be provided with the point of view of the VR content capture device. Predefined-viewing-location VR content may provide the user with three degrees of freedom in the VR space comprising rotation of the viewing direction around any one of x, y and z axes and may therefore be known as three degrees of freedom VR (3DoF VR).

In free-viewing-location VR, the VR content and VR apparatus presenting said VR content may enable a user to be free to explore the virtual reality space. Thus, the user may be provided with a free point of view or viewing location in the virtual reality space. Free-viewing-location VR is also known as six degrees of freedom (6DoF) VR or volumetric VR to those skilled in the art. Thus, in 6DoF VR the user may be free to look in different directions around the VR space by modification of their viewing direction and also free to change their viewing location (their virtual location) in the VR space by translation along any one of x, y and z axes. The movement available in a 6DoF virtual reality space may be divided into two categories: rotational and translational movement (with three degrees of freedom each). Rotational movement enables a user to turn their head to change their viewing direction. The three rotational movements are around x-axis (roll), around y-axis (pitch), and around z-axis (yaw). Translational movement means that the user may also change their point of view in the space to view the VR space from a different virtual location, i.e., move along the x, y, and z axes according to their wishes. The translational movements may be referred to as surge (x), sway (y), and heave (z) using the terms derived from ship motions.

One or more examples described herein relate to 6DoF virtual reality content in which the user is at least substantially free to move in the virtual space either by user-input through physically moving or, for example, via a dedicated user interface (UI).

Augmented reality (AR) may use an AR display, such as glasses or goggles or a virtual retinal display, to augment a view of the real world (such as seen through the glasses or goggles) with computer generated content. An augmented reality apparatus, which may or may not include an AR display, may provide for presentation of multimedia AR content configured to be overlaid over the user's view of the real-world. Thus, a user of augmented reality may be able to view the real-world environment around them, which is augmented or supplemented with content provided by the augmented reality apparatus, which may be overlaid on their view of the real world and/or aurally overlaid over an aural real world scene they can hear. The content may comprise multimedia content such as pictures, photographs, video, diagrams, textual information, aural content among others. Thus, while augmented reality may provide for direct viewing of the real world with the addition of computer generated graphics and/or audio content, a user of virtual reality may only be able to see content presented on the VR display of the virtual reality apparatus substantially without direct viewing of the real world.

One or more examples described herein relate to virtual reality or both augmented and virtual reality, so called mixed reality.

In one or more examples, a user may be able to view a vast array of virtual reality content. Given the immersive nature of VR content it may be difficult for a user to browse or preview multiple instances of VR content. An instance of VR content may comprise a discrete data file or group of data files that define VR content or a predefined subsection of VR content. Thus, similar to how images and/or videos are organised as different data files in a computer system, instances of VR content may be organised in a similar manner. Further, in one or more examples, a user may search a library of VR content using a search query and be provided with plurality of results comprising separate instances of VR content that satisfy the search query. Reviewing those search results may also be difficult and/or time consuming. For user-created VR content the scene or surroundings in which the VR content is captured may be similar from instance to instance of VR content. For example, many of the instances of the VR content may comprise action occurring in the user's garden or house. The subject of the VR content may also be similar between instances of VR content, such as many instances of VR content featuring the user's cat. While these issues of similar subject or similar surroundings have been exemplified in relation to multiple instances of user-created content, this may apply to multiple instances of any VR content.

In one or more examples, the scale of 6DoF virtual reality content in terms of the size of the virtual reality space created from the content and the multitude of viewing locations and viewing directions from which the objects therein may be viewed may also present challenges relating to providing a user with a summary of the VR content. This is because for 6DoF VR content, objects or occurrences may feature or happen at different times and at different locations in the virtual reality space. Thus, while for a fixed point of view virtual reality experience, the playback time point may be sufficient to reference when an object is featured or when an event occurred, for 6DoF content it may be necessary to reference when during the virtual reality content and where in the virtual reality space the objected is featured or the event occurs.

In one or more examples, an apparatus is disclosed that provides for presentation to a user of virtual reality previews each relating to an instance of virtual reality content, the VR previews presented in a VR-content-review-space to provide an immersive browsing or previewing experience of instances of VR content.

FIG. 1 shows an example system 100 for presentation a VR-content-review-space to a user. The system 100 includes an example apparatus 101 for providing for display of the VR-content-review-space with one or more VR previews therein. The apparatus 101 may comprise or be connected to a processor 101A and a memory 101B and may be configured to execute computer program code. The apparatus 101 may have only one processor 101A and one memory 101B but it will be appreciated that other embodiments may utilise more than one processor and/or more than one memory (e.g. same or different processor/memory types). Further, the apparatus 101 may be an Application Specific Integrated Circuit (ASIC).

The processor may be a general purpose processor dedicated to executing/processing information received from other components, such as from a user-movement tracker 102 or content store 103, in accordance with instructions stored in the form of computer program code in the memory.

The output signalling generated by such operations of the processor is provided onwards to further components, such as to a VR display device, such as VR headset 107.

The memory 101B (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example the respective processors and memories are electrically connected to one another internally to allow for electrical communication between the respective components. In this example the components are all located proximate to one another so as to be formed together as an ASIC, in other words, so as to be integrated together as a single chip/circuit that can be installed into an electronic device. In some examples one or more or all of the components may be located separately from one another.

The apparatus 101, in this example, forms part of a virtual reality apparatus 104 for presenting visual imagery in virtual reality. In one or more other examples, the apparatus 101 may form part of a mixed reality apparatus configured to present imagery as augmented reality or virtual reality depending on the content. In one or more examples, the apparatus 100 may be independent of an AR or VR apparatus and may provide signalling to an ARNR/mixed reality apparatus. In this example, the processor 101A and memory 101B is shared by the VR apparatus 104 and the apparatus 101, but in other examples, they may have their own processors and/or memory.

Figure 2:
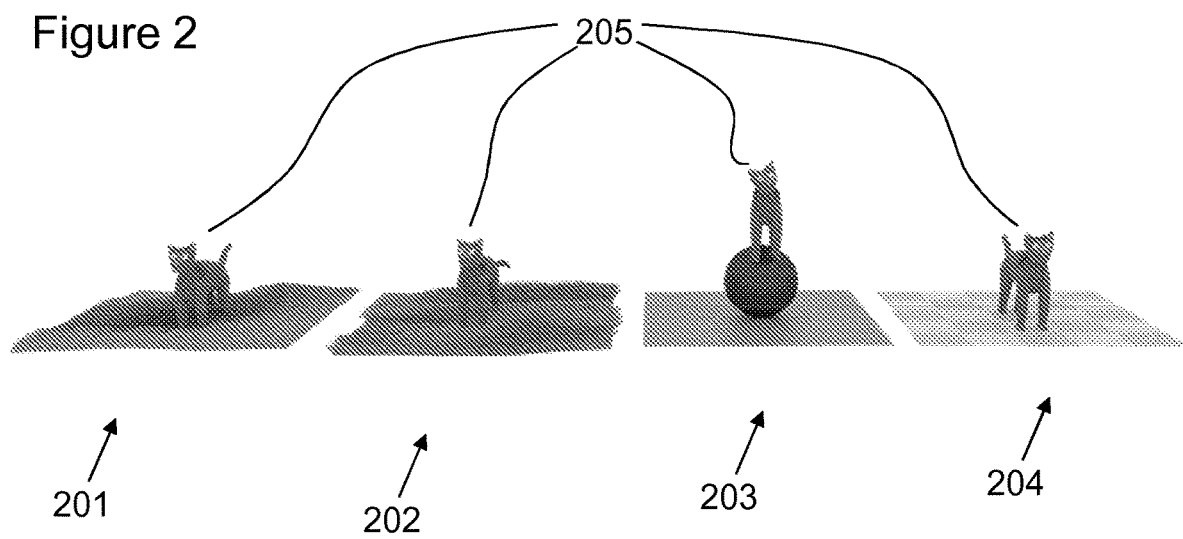
FIG. 2 shows example instances of VR content featuring the same point of interest, a cat.

The example of FIG. 2 does not exemplify the actions of the apparatus 101 and is provided to illustrate possible challenges when presenting VR content. In the example shown in FIG. 2 four different instances of VR content are shown comprising a first instance of VR content 201, a second instance of VR content 202, a third instance of VR content 203 and a fourth instance of VR content 204. It will be appreciated that the VR space that may be generated from each instance of VR content may be spatially larger (e.g. much larger) than what is shown in FIG. 2 and therefore FIG. 2, shows a spatial sub-section of VR space of each instance of VR content. Each of the instances of VR content 201-204 show the same point of interest comprising a cat 205. The point of interest may comprise any of an object, event or occurrence that features in said VR content. Thus, the point of interest may comprise an object such as a cat, a person or a car; an event such as birthday party, an athletics race or a fight; or an occurrence such as someone falling over, a window breaking or a person screaming. In the example of FIG. 2, the four instances of VR content may be the search results of a search query of "cat" of a user's VR content. While in this example, the search has returned four instances of the same cat, it will be appreciated that such a search (or, more generally, in other embodiments) the display of different points of interest, i.e. different cats, that satisfy the search query.

It may be difficult for a user to distinguish between the first and second instance of VR content 201, 202, as the cat is shown in similar surroundings. The fourth instance of VR content 204 may also be difficult for a user to understand as all they are presented with is a cat on a checked floor. For example, a user may be looking for VR content of their cat when they were at a particular location doing a particular thing but it may be difficult to appreciate the context in which the point of interest is shown when previewing VR content.

Figure 3:
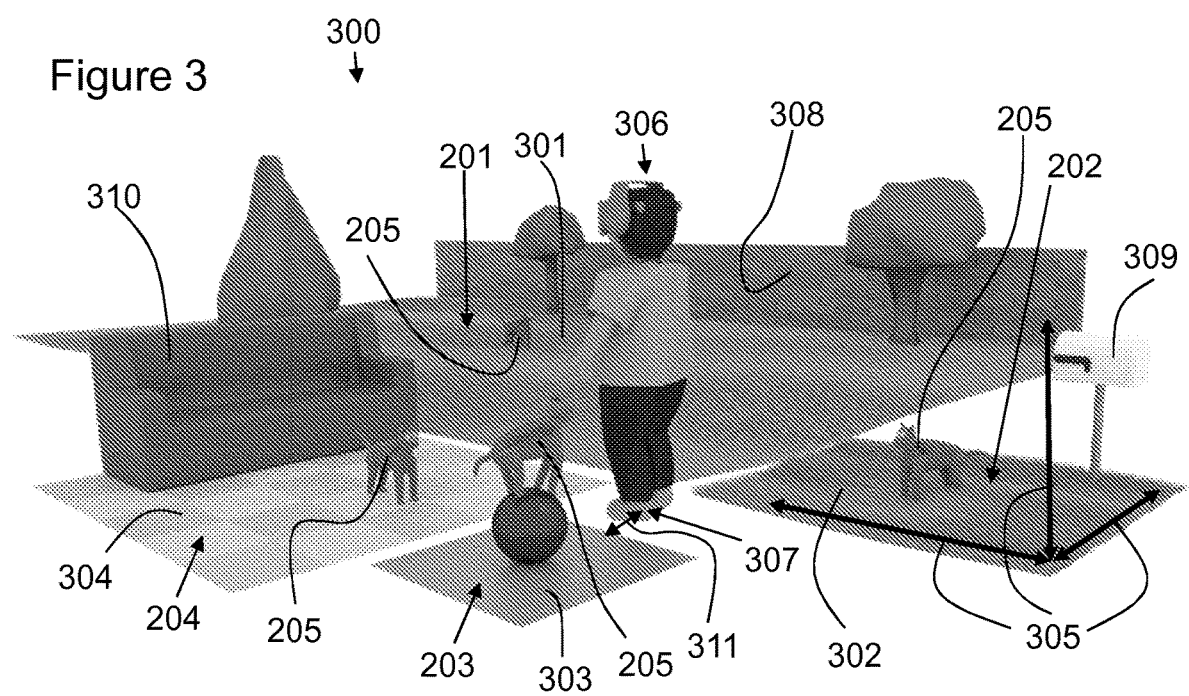
FIG. 3 shows an example view of a VR-content-review-space illustrating the user at its centre.

Turning to the example FIG. 3, the same four instances of VR content 201-204 are now provided for display in a VR-content-review-space 300 based on context information. The VR-content-review-space is a virtual space i.e. a computer generated three dimensional environment in which the VR previews can be displayed. In this example, the context information is provided for each of the instances of VR content rather than one or more of them. The context information may define the extent of a virtual sub-volume of the virtual reality space that includes the point of interest so that, when previewing the instance of virtual reality content, a sufficient proportion or sub-volume of the VR space of the VR content is displayed. It will be appreciated, as mentioned above, that the VR content may define a virtual reality space and the virtual sub-volume may comprise a sub-volume of that virtual reality space. A technical effect of providing for definition of such a sub-volume, may be to provide a better preview of the VR content and thus an improved understanding of the virtual reality space around the point of interest. The sub-volume may thus define a volume less than the total spatial extent of the VR space but greater than a tight bounded space around the point of interest.

Accordingly, in this example, the apparatus 101 or the VR apparatus 104 under the control of the apparatus 101 may, based on a point of interest 205 being identified in one or more instances of virtual reality content 201-204 and based on context information for each instance 201-204 of the virtual reality content, the context information defining the extent of a virtual sub-volume (305 shown in FIG. 3) of the virtual reality space that includes the point of interest 205; provide for display of the VR-content-review-space 300 to a user 306 comprising one or more VR previews of instances of VR content.

The one or more instances 201-204 of virtual reality content may each comprise visual imagery as well as audio to create a virtual reality space in which the visual imagery is displayed and the audio presented. The context information may directly or indirectly define a sub-volume of that VR space that features the point of interest.

It will be appreciated that the example VR-content-review-space 300 shown in FIG. 3 is provided to illustrate what the user 306 may be presented with through the VR headset 107. The image of the user 306 is shown in FIG. 3 for understanding to illustrate what the user 306 would see around them in virtual or augmented reality. An image of the user 306 may or may not be visible in the VR content review space. Accordingly, the sub-volumes of the instances of virtual reality content may be overlaid over the user's view of the real world in augmented reality or the VR-content-review-space 300 may be presented in virtual reality.

The VR-content-review-space 300 thus comprises a virtual space in which a VR preview 301-304 of each of the instances 201-204 of virtual reality content is displayed. The VR previews 301-304 are displayed at a location spaced from a location of the point of view (marked as 307 and, in this example, located at a ground level) of the user 306. The spatial extent of each VR preview 301-304 is defined by the respective sub-volume defined by the context information.

The VR previews 301-304 may each represent one of a plurality of search results of a search for "instances of VR content that include my cat".

Accordingly, the context information allows for definition of the spatial extent of the VR preview for providing the user with an understanding of the virtual reality space around the point of interest 205. Thus, with reference to the first VR preview 301 which relates to the first instance of VR content 201, the context information has provided for inclusion in the sub-volume of the trees and the wall 308, which may enable the user to understand that the first instance of VR content is VR content showing the cat in the park. With reference to the second VR preview 302 which relates to the second instance of VR content 202, the context information has provided for inclusion in the sub-volume of the letterbox 309, which may enable the user to understand that the second instance of VR content is VR content showing the cat in the user's front yard. With reference to the third VR preview 303 which relates to the third instance of VR content 203, the context information has provided for inclusion in the sub-volume of the ball, because the act of balancing on the ball may distinguish third instance of VR content from the first, second and fourth instances (and for example all other search results). With reference to the fourth VR preview 304 which relates to the fourth instance of VR content 204, the context information has provided for inclusion in the sub-volume of the sofa 310, which may enable the user to understand that the fourth instance of VR content is VR content showing the cat in user's home.

The VR previews 301-304 may thus show sub-volumes that comprise an amount of the virtual reality space of their associated instance of virtual reality content to distinguish surroundings of the point of interest 205 in the sub-volume from surroundings of the point of interest in the sub-volume of any other of the one or more instances of virtual reality content. The context information may comprise information for defining the sub-volume for a plurality of different objects that features in the instance of VR content, the point of interest comprising one of those objects. Accordingly the content information may be particular to an instance of VR content and/or specific to objects in said instance of VR content.

How much of the surroundings to include in the sub-volume may be determined in various different ways. In one or more examples, the context information is configured to define the sub-volume such that it includes at least one feature in the visual imagery of the VR content at a virtual location around said point of interest to provide an indication of the virtual surroundings of the point of interest. The at least one feature may be termed an "associated nearby feature". The nearby feature may be "associated" in that it provides an understanding of the surroundings of the point of interest, i.e. context. Thus, rather than show the point of interest on its own, as in FIG. 2, the context information may define a sub-volume that includes at least one associated nearby feature present in the VR content. Thus, for the second VR preview 302, that feature may comprise the letterbox 309. The sub-volume may then be sized such that the VR preview shows the point of interest and is of dimensions to include the letterbox 309. In one or more examples, the sub-volume may then be oriented such that the VR preview shows the point of interest and the associated nearby feature, the letterbox 309, is not hidden by other objects. Thus, the sub-volume may be one or more of sized or the visual imagery oriented therein to show the point of interest and the associated nearby feature. The point of interest may be centred in the sub-volume and the associated nearby feature may be substantially at an edge of the sub-volume. The associated nearby feature may be the nearest feature to the point of interest or may be predefined by the user or content creator.

Accordingly, in one or more examples, the context information may define the sub-volume, in part, by reference to another feature 309 in the VR content.

In one or more other examples, the context information may define the dimensions of the sub-volume that includes the point of interest 205. Accordingly, for each point of interest 205, a sub-volume may be defined that is sized sufficiently for the surroundings of the point of interest to be identifiable. The size of the sub-volume may change with elapsed time through the VR content as the point of interest moves relative to other objects in the VR space.

In one or more other examples, the context information may define the sub-volume by reference to a virtual distance from the point of interest to the nearest other object or an associated nearby feature in the visual imagery of the instance of virtual reality content. Thus, in one or more examples, the distance between the point of interest 205 and another object 309 may comprise the context information. The context distance of the information may then be used to define a sub-volume that includes the point of interest and regions up to the virtual distance away from the point of interest.

In one or more other examples, the context information may comprise an identifier of at least one feature in the visual imagery of the instance of virtual reality content, such as an identifier to identify the letterbox 309. The apparatus 101 or other apparatus may then determine the dimensions of the sub-volume that includes the feature of the identifier and the point of interest.

It will be appreciated from the above examples that the context information may take various forms that may all provide for definition of the sub-volume 305 to provide as a VR preview 302.

The context information may be generated at various different times. For example, it may be generated manually or automatically when the instance of VR content was captured or at a time subsequent thereto. The context information may be generated when the VR previews are generated based on analysis, such as computer analysis, of the surroundings of the point of interest in the VR space.

Thus, in one or more examples, the context information may be predefined and associated with the VR content 201-204. The context information may comprise information to define the sub-volume associated with just one point of interest or a plurality of points of interest that feature in said virtual reality content. Thus, the context information may comprise a list of points of interest objects that feature in the VR content and associated nearby features near to the points of interest objects to define the sub-volumes.

The context information may be generated automatically based on captured VR content, such as when the VR-content-review-space is generated. In one or more examples computer-based content analysis may be performed to identify the location of the point of interest in said virtual reality space of said instance of virtual reality content and define the sub-volume therearound to provide the user with an understanding of the virtual reality space around the point of interest. The parameters on which the computer-based content analysis may operate may be to identify the nearest object to the point of interest or identify the nearest unique object to the point of interest compared to the objects identified for other instances of VR content or other instances of VR content that are to be displayed in the VR-content-review-space 300. Other computer based pattern recognition and segmentation or deep learning algorithms may be used that "understand" which nearby objects may be useful for understanding the context in which the point of interest is displayed.

Accordingly, in general, the content analysis may determine the size of the sub-volume of each VR preview based on a measure of how distinguished each VR preview is from the other VR previews. Thus, if content analysis operated based on the strategy that the nearest object is included in the VR preview but the nearest object in all of the VR previews was a tree, the user may still find it difficult to distinguish between the instance of VR content. However, if the apparatus 101 is configured to ensure each VR preview is distinguishable from each other previews presented to the user, such as in terms of the feature(s) included in the sub-volume, then the VR previews may be different to one another.

In one or more examples, the context information may be generated, at least in part, from user-settings that specify the size of the sub-volume for the point of interest. Thus, a user 306 may specify that they wish to see a larger or smaller region of the VR space around a particular point of interest 205 as the sub-volume.

The context information may therefore be specific to the point of interest featured in the instance of VR content. The context information may apply to only one point of interest or a class of points of interest. For example, the context information may relate only to a particular cat 205 (e.g. the user's 306 cat) or may relate to cats in general as a class. The context information may, in addition, be specific to the surroundings of the point of interest in the respective instance of VR content. Thus, for example, the cat appearing in a crowded scene with many other objects may provide for the context information defining a smaller sub-volume as the many other objects provide sufficient context. To the contrary, the cat appearing in a scene sparse of other objects may provide for the context information defining a larger sub-volume in order for the context in which the point of interest is present to be understood. The context information may vary depending on an elapsed time through the VR content. Thus, the context information may thus be specific to the time at which the point of interest features in the instance of VR content.

As shown in the example of FIG. 3, the VR preview comprises a spatial sub-volume, defined by the context information, of the whole VR space that may be generated from the instance of VR content. The VR preview may comprise a fixed image, i.e. non-moving, of the point of interest in the VR content. In such examples, the VR preview 301-304 appears as a freeze frame of the VR content. In other examples the VR preview 301-304 may comprise a slideshow of still images of the point of interest. In one or more examples, the VR preview may comprise moving imagery, i.e. a video or 3-D video, of the point of interest as it appears in the instance of VR content. The moving imagery may comprise moving imagery of temporal parts of the instance of VR content only or predominately at times that feature the point of interest. In other examples the moving imagery may be from discontinuous times throughout the instance of VR content wherein only one or some of the parts feature the point of interest. In general, the VR preview may show a temporal subset of a period of time covered by the instance of VR content. The temporal subset may, for example, comprise the times that the point of interest features in the instance of VR content. In one or more examples, the VR preview may comprise a combination of fixed imagery and moving imagery, sometimes known as a Cinemagraph.

Figure 4:
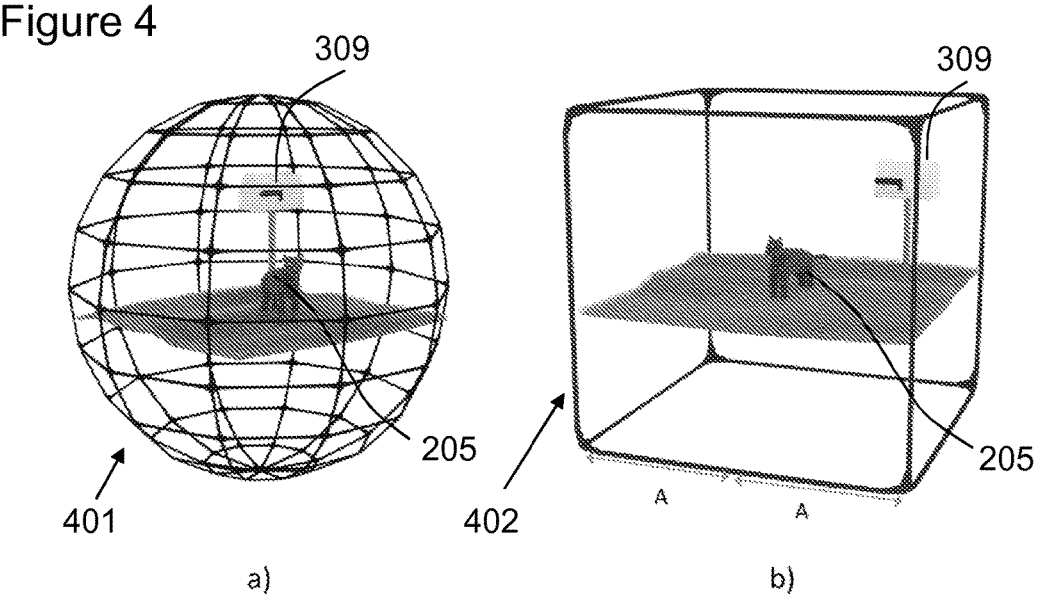
FIG. 4 shows a first and second example of a sub-volume of a VR preview.

FIG. 4 shows two examples 401 and 402 of the sub-volumes defined by the context information that form the second VR preview 302. The first example 401 shows a substantially spherical-shaped sub-volume. In one or more examples, the context information may define the distance to the associated nearby feature (the letterbox) and a sphere may be generated using that distance and the point of interest as a centre point. The second example 402 shows a substantially cube-shaped or cuboid-shaped sub-volume. It will be appreciated that other shaped sub-volumes may be used to form the VR previews 301-304. Further, the cube or cuboid sub-volumes may have rounded edges and/or corners. In some examples, the sub-volumes are substantially the same shape and in other examples they may be different shapes. In some examples, the sub-volumes are substantially sectorial-shaped sub-volumes. The example of FIG. 3 shows cuboid-shaped sub-volumes of different aspect ratios. As will be appreciated, the third VR preview 303 comprises a sub-volume that is substantially cube-shaped, while the second VR preview 302 comprises a sub-volume that is substantially cuboid-shaped.

In some examples, the bounds of the sub-volume may be provided for display and in other examples, the bounds may be hidden. FIG. 4 shows the bounds of the sub-volume as a wire frame to clearly illustrate the shape of the sub-volume. The example of FIG. 3 does not show such a wire frame view.

The VR previews 301-304 in this example are configured to present the point of interest substantially at the centre of the sub-volume 401, 402. However, in other examples, the point of interest may be offset to one side of the sub-volume, such as to include the associated nearby feature.

Typically, the ground level for the instances of VR content provides a bound on the VR space. Thus, the VR content may not include imagery for underground features. Placement of the point of interest at the centre of the sub-volume may apply in horizontally aligned x and y directions only and may or may not apply in a vertically aligned z direction.

In one or more examples, (i) the location of the ground level relative to the point of interest in the instance of VR content and (ii) the position in the sub-volume the apparatus 101 places the point of interest may define how much of the sub-volume contains imagery of the VR content. Thus, as shown in FIG. 4, substantially the lower half of the VR preview is absent of imagery of the instance of VR content because it is below ground level. If the point of interest had a high elevation above ground level, such as if the cat 205 was in a tree, the ground level may not be visible in the VR preview 301-304. The presentation of ground level in the VR previews 301-304 may be important, as will be described below. In one or more examples, the ground level in the one or more VR previews is aligned with the ground level in the VR-content-review-space 300.

In the examples described herein the scale of the point of interest is substantially equal between VR previews 301-304. The relative size of each of the VR previews relative to the other VR previews may therefore be defined by the size of the virtual sub-volume defined by the context information for each instance of VR content. Thus, the sub-volumes of the VR previews 301-304 are sized in accordance with the context information rather than showing a "zoomed in" or "zoomed out" view of their associated VR space cropped to the shape of the sub-volume. It will be appreciated that the VR-content-review-space comprises a virtual three-dimensional space and therefore the further the point of interest is away from the point of view of the user, the smaller it may appear. Accordingly, the scale of the point of interest may be substantially equal but the displayed size of the point of interest may be different depending on the distance from the point of view of the user 306. In other examples, the scale of the point of interest and of the VR space between VR previews 301-304 may differ.

6DoF VR allows an object appearing therein to be viewed from many different or, in some examples, any angle. In one or more examples, the direction from which the point of interest is viewed in the VR preview may be determined based on the configuration of the point of interest. For example, the cat 205 may be presented such that the cat's face faces the user 206. Each point of interest may be assigned a preferred orientation by the user or VR content creator. In one or more examples, the apparatus may determine the direction from which the point of interest is viewed in the VR preview based on the location of the associated nearby feature relative to the point of interest and the shape of the sub-volume. For example, if the shape of the sub-volume would result in the exclusion of the associated nearby feature from view when the point of interest is oriented in a first orientation but not when oriented in second, different orientation, the apparatus 101 may provide for rotation of the VR space that forms the sub-volume to the second orientation to fit the shape of the VR preview. In one or more examples, the apparatus 101 may determine a preferred orientation for viewing of the point of interest. In one or more examples, the apparatus may deviate from said preferred orientation based on the point of interest and the at least one associated nearby feature not being visible in said preferred orientation due to the shape of the VR preview.

In one or more examples, the one or more VR previews 301-304 may be considered to comprise a three-dimensional window to view the sub-volume of the virtual reality space. The sub-volume of the virtual reality space of the associated VR content may be rotated. Accordingly, the user may be presented with a rotating sub-volume of the virtual reality space through the fixed (e.g. non-rotating) three-dimensional VR preview window. Depending on the size and/or shape of the window, rotation of the sub-volume of the VR space may cause the at least one associated nearby feature to fall outside the VR preview window for at least a portion of the rotation. The apparatus, in one or more examples, may be configured to prevent the associated nearby feature falling outside the window by one or more of temporarily growing the size or altering the shape of the VR preview window or by movement of the centre of rotation of the VR space in the VR preview window such that the at least one feature and point of interest remain within the window of the VR preview throughout the rotation of the sub-volume. In other embodiments, the modification of the VR preview window size, shape, or alignment may not be done while the window is being rotated by the user. Rather the modification action, if necessary due to the associated nearby feature falling outside the window, may be performed only once the user completes the rotation and the VR preview window thus achieves a rest state (without modification of its position or orientation by the user).

Thus, the one or more VR previews 301-304 may be provided for display such that the VR previews comprise a three dimensional window through which the sub-volumes viewed and wherein the VR previews are provided with a substantially fixed orientation relative to the user 306 and the sub-volumes of virtual reality space and the point of interest displayed therein are rotated.

A penalty function may be defined, upon which the apparatus selects one of growing the size of the sub-volume such that at least the associated nearby feature in a preferred direction is visible, or rotating the sub-volume such that the at least one contextual object remains in the part of the VR preview that is rendered for the user.

The apparatus 101 may provide for different layouts of the VR previews 301-304 in the VR-content-review-space 300. In the example of FIG. 3 the plurality of VR previews 301-304 of instances of virtual reality content 201-204 are each provided for display in the VR-content-review-space at a non-overlapping location that is spaced (by distance 311) from the point of view 307 of the user (or a floor level projection of it). The user 306 is therefore presented with the VR-content-review-space 300 with the user placed at its centre and the VR previews 301-304 around them. The VR previews 301-304 are arranged to surround the user 306, although in other examples, the VR previews may be arranged in a predetermined region of the VR-content-review-space 300, such as in front of the user and not behind the user 306.

Figure 5:
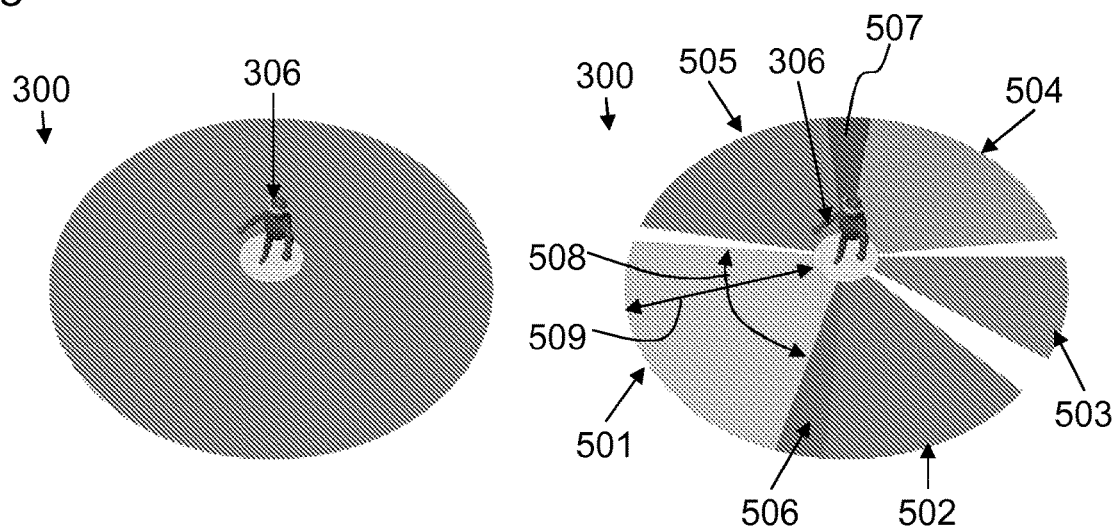
FIG. 5 shows a view of a VR-content-review-space with a first and second example configuration.

The example of FIG. 5 shows the user 306 in a VR-content-review-space 300. The left-hand image of FIG. 5 shows a region of the VR-content-review-space 300 in which VR previews may be positioned by the apparatus 101. The right-hand image of FIG. 5 shows where in the VR-content-review-space 300 the apparatus 101 may place a plurality of VR previews 501-505. Further, in this example, the VR previews 501-505 are sector shaped and surround the user 306.

Figure 7:
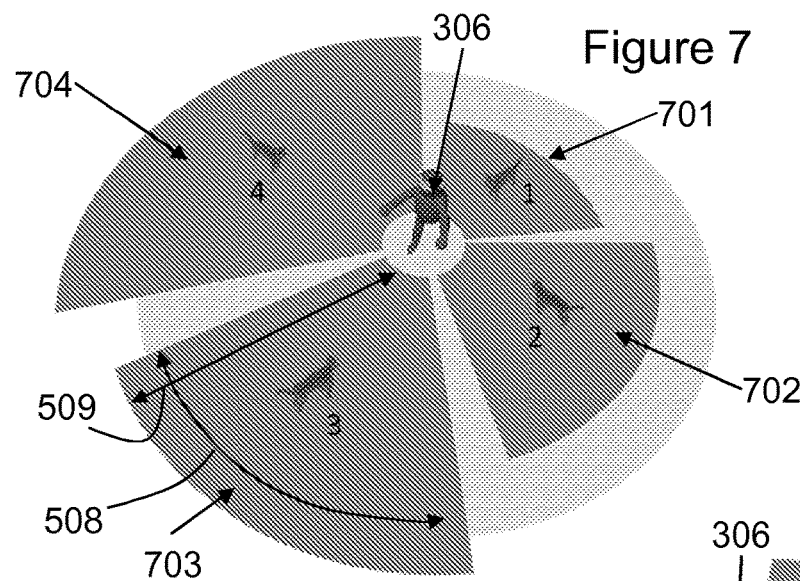
FIG. 7 shows a view of a VR-content-review-space with a fifth example configuration.

In the example of FIG. 5, the VR preview 501 and VR preview 502 are shown to partially overlap in region 506. Further, the VR preview 504 and VR preview 505 are shown to partially overlap in region 507. The VR preview 503 and adjacent VR previews 502, 504 do not overlap and are spaced from one another. In this example, the width or angular width 508 of each of the sectors 501-505 may be defined by the context information and the depth 509 may be predetermined. Alternatively, in other examples, the context information may define the angular width 508 and define the depth 509, as shown in the example of FIG. 7. In the example of FIG. 7, the point of interest, the cat 205, is presented at the centre of the sub-volume of the VR preview. FIG. 7 further illustrates the centering of the point of interest in the VR preview in terms of both width 508 and in terms of depth 509. Thus, in VR previews 701, 702, 703 and 704 the point of interest may be of varying distances from the user 306 as it is centred with respect to the depth of the VR preview sub volume. In one or more examples, the VR previews may be configured such that the distance from the user's point of view to the point of interest may be the same in each preview whether or not two or more of the VR previews are provided with different depths 509. In one or more examples, the apparatus 101 may select the orientation with which the VR space is presented to fit the point of interest (not shown in this figure) and the associated-nearby-feature into the shape of the sub-volume.

In general terms, the first VR preview 501 may be located to the side (or above or below) of the second VR preview 502 in the VR-content-review-space 300 from the point of view of the user 306 and the sub-volume of the first VR preview 501 and sub-volume of the second VR preview 502 may at least partially overlap one another at region 506.

Figure 6:
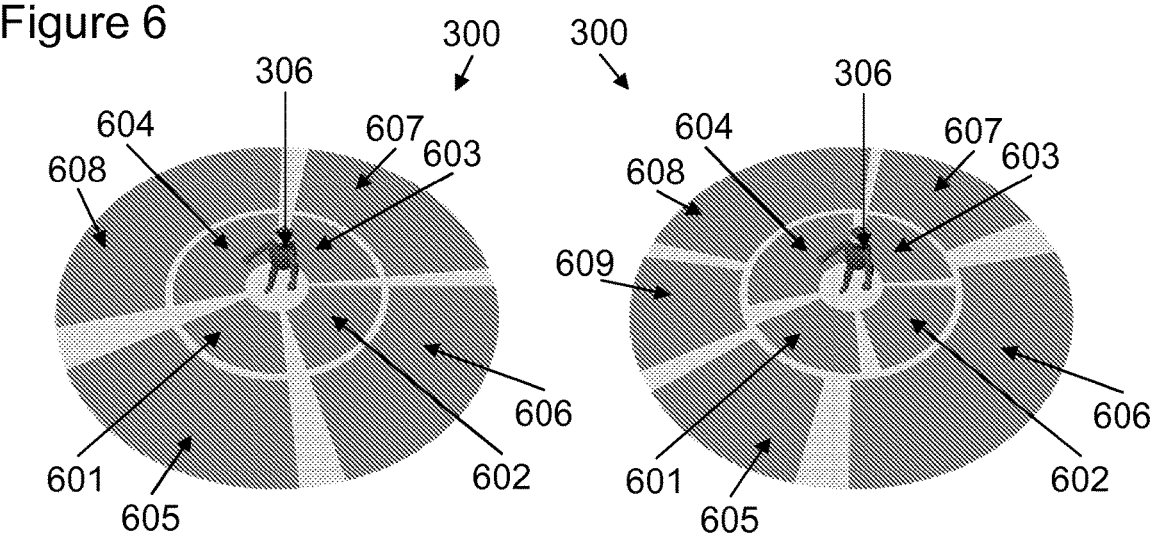
FIG. 6 shows a view of a VR-content-review-space with a third and fourth example configuration.

The examples of FIG. 6 show the apparatus 101 having positioned the VR previews 601-608 in a sector arrangement around the user 306. In this example, one VR preview 601, for example, is arranged in front of another VR preview 605, for example, from the point of view of the user 306. Thus, the VR previews are arranged in tiers. In this example the VR previews are arranged in two ring-shaped tiers. In the left-hand image of FIG. 6 the VR previews 601-604 of the first tier are aligned in terms of their width with the VR previews 605-608 of the second tier. In some examples, the apparatus 101 may rank the VR previews in terms of relevance to the user and arrange the more relevant VR previews in tiers closer to the user and less relevant VR previews in tiers further from the user. Thus, if the VR previews were the results of a search, the more relevant search results may be placed closer to the user 306 in the VR-content-review-space 300. In one or more examples, the VR previews may be ranked in terms of relevance to the user (such as based on a search query or based on information provided to the apparatus) and the apparatus may be configured to position the VR previews in the content review space based on the ranking, the positioning taking account of one or more of a tier in which the VR preview is placed and the viewing direction of the user such that higher ranked VR previews are placed in front of the user's viewing direction and/or in a tier nearer the user and lower ranked VR previews are placed behind a user's viewing direction and/or in a tier further from the user.

The right-hand image of FIG. 6 shows a similar example layout to the left-hand image. However, in the right-hand image a further ninth VR preview 609 is shown and the VR previews 601-604 of the first tier are not aligned in terms of the edges of their widths with the VR previews 605-609 of the second tier.

While the tiers in this example are ring shaped, the tiers may be of any shape and may designate, more generally, a region of space in the VR-content-review space 300 in which VR previews may be positioned, each tier defining a different continuous band of distances from the point of view of the user at which the VR previews may be arranged.

It will be appreciated that in examples where the VR previews are arranged in tiers such that a first VR preview may be located in front of a second VR preview from the point of view of the user, the apparatus 101 may provide various ways to view the one or more VR previews of the second tier or subsequent tiers, if provided. In one or more examples, one or more of the VR previews of the first tier may be displayed with at least partial transparency to provide for viewing of the one or more VR previews of a second tier. In some examples, the use of transparency may not be required such as if the sub-volume of the VR preview does not include opaque objects such as walls. Thus, an outdoor scene may already be transparent due to the absence of objects in the VR content that may block a view through the sub-volume. It is understood this applies to both computer-generated content and to real-life captured content, which includes the necessary depth, and/or other volumetric information.

In one or more examples, the apparatus 101 may, based on user-input, make the "higher tier" VR preview 605 visible to the user by making the "lower tier" VR preview 601 transparent or removing it from display, such as temporarily removing it. In other examples, the location of the "lower tier" VR preview 601 may be shifted in the VR-content-review-space so that the "higher tier" VR preview 605 is visible to the user 306.

Figure 8:
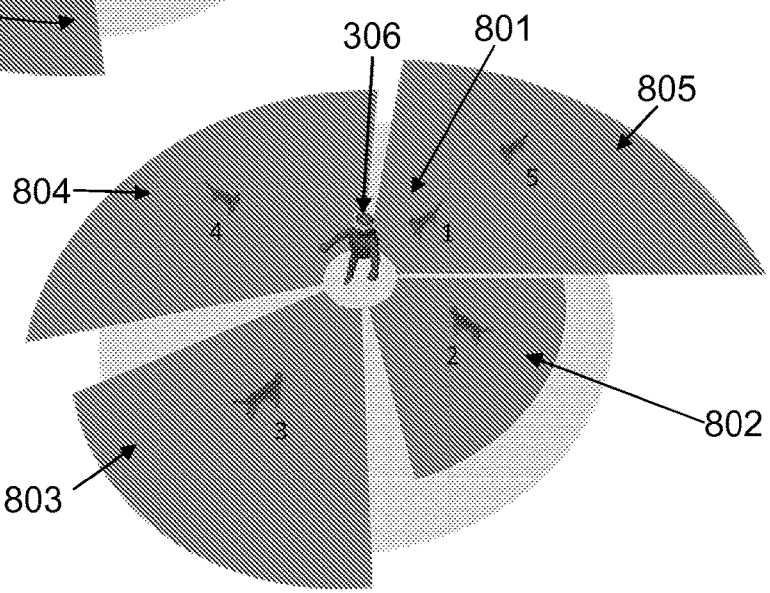
FIG. 8 shows a view of a VR-content-review-space with a sixth example configuration.

The example of FIG. 8 shows an example layout of VR previews 801, 802, 803, 804, 805 in which a first sector shaped VR preview 801 is provided for display overlapping with a fifth sector shaped VR preview 805. In particular, the first VR preview 801 is provided for display within the sub-volume of the fifth VR preview 805.

In one or more examples, the apparatus may, based on sub-volume content analysis to identify a region of the sub-volume of a VR preview that does not include the associated nearby feature, provide for display of a further VR preview in an overlapping configuration wherein the sub-volumes overlap in the identified region. Thus, the apparatus 101 may allow the VR previews to overlap in places where the features that provide context to the point of interest are not present to avoid covering them or hindering their viewing by the user 306.

Figure 9:
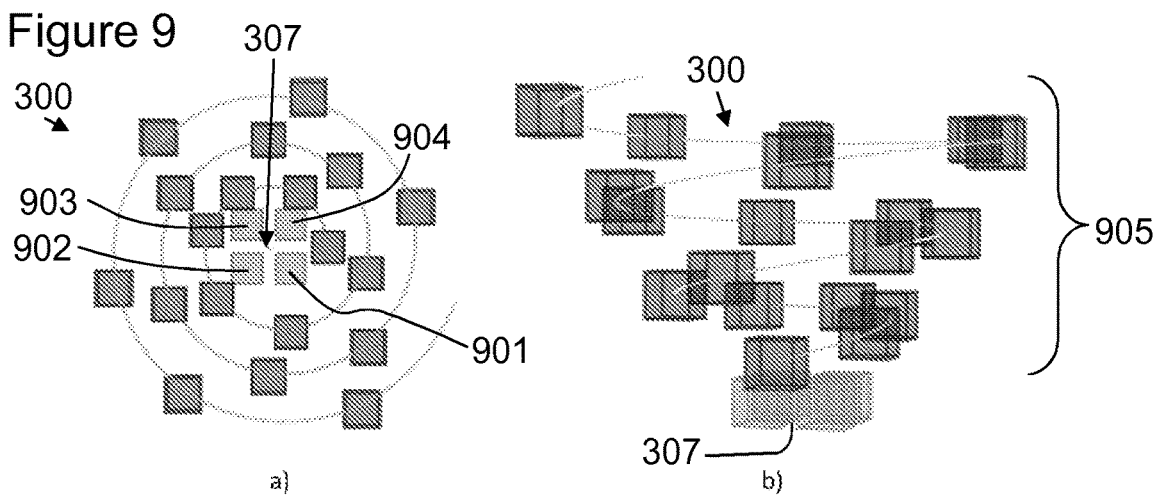
FIG. 9 shows a view of a VR-content-review-space with a seventh, spiral, example configuration.

The example of FIG. 9 shows a further layout of VR previews in a VR-content-review-space 300. FIG. 9 illustrates the presentation of VR previews not just arranged relative to a two-dimensional plane but arranged along a spiral track that encircles the location 307 of the point of view of the user in the VR-content-review-space. A top view is shown in FIG. 9a and a perspective view is shown in FIG. 9b. The apparatus may provide for display of a VR preview 901-904 at the height of the user's point of view, similar to previous examples. The apparatus 101, in response to a specific user input may provide for lowering of the spiral relative to the user such that the other VR previews 905 become level with the user's point of view. The spiral may be rotated or spun to provide the effect of drawing the VR previews 905 down towards the user's line of sight. The spiral track may be provided to extend below the user 306 as well as above the user 306 to provide an opposite browsing direction. Alternatively, there may be two spirals extending above the user for example in opposite directions to provide the same functionality.

The example of FIG. 10 shows a further layout of the VR-content-review-space 300. In the example of FIG. 10 a plan view is shown. In this layout, the user 306 is partially surrounded by VR previews 1001, 1002, 1003, 1004, 1005 similar to the other examples in a limited region shown as dashed region 1020. The remaining region 1021 of the VR-content-review-space 300 includes further VR previews shown collectively as 1006 that extend into the distance.

This arrangement may be advantageous when there are many VR previews as VR previews in region 1020 or moved into region 1020 may be easily selectable while the user will be aware of the many other VR previews in region 1021. The user may not be able to select VR previews from the region 1021 and may be required to move the VR previews, as if on a carousel, to the region 1020.

The VR-content-review-space 300 may provide a virtual three-dimensional space for a user 306 to review or preview different instances of VR content. The apparatus 101 may further provide for user selection of one of the VR previews to perform functionality related to the selected VR preview.

The user selection may comprise the user selecting one of the VR previews using an interface such as a smartphone or other input device. Alternatively, the apparatus may determine a user selection based on movement of the user in the VR-content-review-space 300. In one or more examples, the user-movement tracker 102 may provide data indicative of real-world physical user movement to the apparatus 101 and based on the data the apparatus 101 may identify a user selection.

Thus, in one or more examples, the user may step into one of the VR previews to select it. As the VR-content-review-space 300 may comprise a 6DoF virtual reality space or an augmented reality space, the movement of the user around said space may be intuitive to the user 306.

The apparatus 101, based on a user input to move their point of view 307 in the VR-content-review-space 300 to a position within the sub-volume of a particular one of the VR previews 301-304, may provide for a variety of actions.

For example, if the VR previews comprise non-moving imagery, i.e. still imagery, moving into the VR preview may cause the apparatus 101 to provide for presentation of at least a temporal sub-section of the instance of VR content associated with the particular VR preview, at least a portion of the temporal sub-section featuring the point of interest. Thus, moving imagery may be provided of the VR content that features the point of interest. The temporal sub-section may be considered as a summary or highlights of the instance of VR content. At least a portion of the highlights may feature the point of interest.

Other functionality that may be provided on user selection of one of the VR previews includes presentation of the instance of VR content associated with the selected VR preview in virtual reality. Thus, the apparatus may cease presentation of the VR-content-review-space 300 with the sub-volumes of the VR spaces therein, and provide for display of the VR space of the instance of VR content that is associated with the selected VR preview. Accordingly, the apparatus 101 may provide for a transition from the VR-content-review-space to the VR space of the selected VR content, as if the user stepped into the world represented by the selected VR preview. The user may be provided with substantially the same location in the VR space as shown in the VR preview. With reference to FIG. 3, the user may step into the second VR preview 302. The second VR preview 302 is associated with the second instance of VR content 202. The second instance of VR content 202 includes visual imagery from which a VR space can be generated. Thus, on user selection of the second VR preview 302, the apparatus may provide for display of the VR space with visual imagery from the second instance of VR content and thereby present the imagery of the user's front yard surrounding them.

Other functionality that may be provided on user selection of one of the VR previews includes presentation of a larger volume of the virtual reality space than that defined by the sub-volume. Thus, the sub-volume may show at least an associated-nearby-feature in order for the user to understand the context of the VR content, but the user selection may provide for display of a larger volume of the VR space generated from the selected instance of VR content (via selection of the associated VR preview). Similarly, whatever audio may be presented when displaying the VR content-review-space 300 may be replaced by the audio related to the selected instance of the VR content.

Other functionality that may be provided on user selection of one of the VR previews includes removal from display of the VR previews other than the selected VR preview. Thus, based on user selection of the second VR preview 302, the first, third and fourth VR previews 301, 303, 304 may be removed from display.

It will be appreciated that one, some or all of the above functionality mentioned above may be provided with appropriate user input to identify the functionality the user wishes to actuate.

When the user steps or moves their point of view into one of the VR previews 301-304 they may be placed at a ground level defined in the VR space of the instance of VR content they step into. Thus, it may be advantageous to provide the ground level of the VR space shown in the VR preview at the same level as ground level in the VR-content-review-space 300. Otherwise when the user steps into the VR preview they may step into "mid-air" or an underground region of the VR space. Based on user selection of a VR preview in which the ground level is not visible, for example when the point of interest happens to be some distance from the ground level, the apparatus may provide for display of the selected VR preview such that the ground level becomes visible to the user. Accordingly, if the apparatus 101 were then to present the VR space of the selected VR preview, the user 306 understands where they have stepped into relative to the point of interest.

As an example, the cat 205 may be shown in a VR preview at the top of a tall tree and the sub-volume may not be sized sufficiently to show ground level. When the user makes a user selection of the VR preview, the apparatus 101 may animate the movement or expansion of the VR preview or the volume of the VR space shown in the VR preview such that the ground level becomes visible at the base of the tree. The user 306 may then understand that when stepping into the VR preview to select the VR content of the cat in the tall tree is shown in preference to the VR-content-review-space, they are located at the base of the tall tree.

The action of stepping into different VR spaces, represented by the VR previews from the VR-content-review-space may provide an effective way of selecting the VR content for the user to become immersed in. It will be appreciated that other ways of selecting the VR previews may be used.

FIG. 11 shows a flow diagram illustrating the steps of, based on 1101 a point of interest being identified in one or more instances of virtual reality content, the one or more instances of virtual reality content each comprising at least visual imagery to provide a virtual reality space in which the visual imagery is displayed; and based on context information for one or more of or each instance of the virtual reality content, the context information defining the extent of a virtual sub-volume of the virtual reality space that includes the point of interest;

providing 1102 for display in one of virtual reality and augmented reality of a VR-content-review-space to a user, the VR-content-review-space comprising a virtual space in which a VR preview of the at least one instance of virtual reality content is displayed at a location spaced from a point of view of the user, each VR preview comprising the respective sub-volume defined by the context information for providing the user with an view or understanding of the virtual reality space around the point of interest.

FIG. 12 illustrates schematically a computer/processor readable medium 1200 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising
at least one processor; and
at least one memory including computer program code;
the at least one memory and the computer program code configured to, with the at least one processor, cause the apparatus at least to perform:
based on a point of interest being identified in one or more instances of virtual reality content, the one or more instances of virtual reality content comprising at least visual imagery and data to provide a virtual reality space in which the visual imagery is displayed; and
based on context information for at least one of the one or more instances of the virtual reality content, the context information defining the extent of a virtual sub-volume of the virtual reality space that includes the point of interest;
provide for display of a virtual-reality-content-review-space to a user, the virtual-reality-content-review-space comprising a virtual space in which a virtual reality preview of the one or more instances of virtual reality content is displayed at a location spaced from a point of view of the user, the one or more virtual reality previews comprising the respective sub-volume defined by the context information for providing the user with a view of the virtual reality space around the point of interest.

2. The apparatus of claim 1, wherein the sub-volume comprises an amount of the virtual reality space of one or more instances of virtual reality content to distinguish surroundings of the point of interest in the sub-volume from surroundings of the point of interest in the sub-volume of any other of the one or more instances of virtual reality content.

3. The apparatus of claim 1, wherein the context information is one or more of:
predefined and associated with the virtual reality content, the context information providing information to define the sub-volume associated with one or more points of interest that feature in said virtual reality content;
generated from computer content analysis configured to identify the location of the point of interest in said virtual reality space of said instance of virtual reality content and define the sub-volume therearound to provide the user with an understanding of the virtual reality space around the point of interest; or
generated, at least in part, from user-settings that specify the size of the sub-volume for the point of interest.

4. The apparatus of claim 1, wherein the context information is specific to the point of interest and to its surroundings in the respective instance of virtual reality content.

5. The apparatus of claim 1, wherein the context information defines an associated nearby feature in the virtual reality content, the sub-volume defined such that it includes the point of interest and the associated nearby feature, the associated nearby feature comprising a predetermined feature in the visual imagery of the instance of virtual reality content at a virtual location around said point of interest to provide an indication of the virtual surroundings of the point of interest.

6. The apparatus of claim 1, wherein the one or more instances of virtual reality content comprises search results of a search query, the search query performed on a plurality of instances of virtual reality content that include the one or more instances of virtual reality content, the point of interest comprising the subject of a search query from which said search results were generated.

7. The apparatus of claim 1, wherein a plurality of virtual reality previews of instances of virtual reality content are provided for display in the virtual-reality-content-review-space, the virtual reality previews displayed at a location spaced from a point of view of the user and at least partially surrounding the point of view of the user.

8. The apparatus of claim 1, wherein at least two virtual reality previews are provided for display, and wherein the relative size of each of the two or more virtual reality previews relative to other virtual reality previews provided for display is defined by the size of the virtual sub-volume defined by the context information for two or more instances of virtual reality content.

9. The apparatus of claim 1, wherein at least two virtual reality previews are provided for display, a first virtual reality preview and a second virtual reality preview and wherein one or more of:
the first virtual reality preview is located to the side of the second virtual reality preview in the virtual-reality-content-review-space from the point of view of the user and the virtual sub-volume of the first virtual reality preview and virtual sub-volume of the second virtual reality preview overlap one another;
the virtual sub-volume of the first virtual reality preview and virtual sub-volume of the second virtual reality preview are non-overlapping;
the first virtual reality preview is located in front of the second virtual reality preview in the virtual-reality-content-review-space from the point of view of the user and the first virtual reality preview is displayed with at least partial transparency to provide for viewing of the second virtual reality preview through the first virtual reality preview; or the first virtual reality preview is located in front of the second virtual reality preview in the virtual-reality-content-review-space from the point of view of the user thereby hiding the second virtual reality preview from view, wherein based on user-input the second virtual reality preview is made visible to the user.

10. The apparatus of claim 1, wherein based on a user input to move their point of view in the virtual-reality-content-review-space to a position within the sub-volume of a particular one of the virtual reality previews, provide for one or more of:
presentation of at least a temporal sub-section of the instance of virtual reality content associated with the particular virtual reality preview, at least a portion of the temporal section featuring the point of interest;
presentation of the instance of virtual reality content associated with the particular virtual reality preview in virtual reality;
presentation of a larger volume of the virtual reality space that that defined by the sub-volume; or
removal from display of the virtual reality previews other than the particular virtual reality preview.

11. The apparatus of claim 1, wherein the one or more virtual reality previews comprise one or more of:
substantially cuboid-shaped sub-volumes;
substantially spherical-shaped sub-volumes; or
substantially sectorial-shaped sub-volumes.

12. The apparatus of claim 1, wherein the one or more virtual reality previews are provided for display such that one or more virtual reality preview comprises a window through which the sub-volumes are viewed and wherein the virtual reality previews are provided with a substantially fixed orientation relative to the user and the sub-volumes of virtual reality space and the point of interest therein are rotated.

13. The apparatus of claim 1, wherein the one or more virtual reality previews are provided for display in one or more of the following configurations:
in a plane surrounding the point of view of the user;
in at least two planes, a first of the planes arranged substantially horizontally and surrounding the point of view of the user and the second of the planes arranged substantially horizontally and above or below the point of view of the user, spaced from the first plane;
in a plurality of sectors that converge at the point of view of the user;
in a first tier comprising a plurality of sectors that converge at the point of view of the user and a second tier comprising a plurality of sectors arranged in a ring that is substantially centered at the point of view of the user; or
at spaced points along a spiral that spirals around the point of view of the user.

14. A method, the method comprising
based on a point of interest being identified in one or more instances of virtual reality content, the one or more instances of virtual reality content comprising at least visual imagery to provide a virtual reality space in which the visual imagery is displayed; and based on context information for at least one of the one or more instances of the virtual reality content, the context information defining the extent of a virtual sub-volume of the virtual reality space that includes the point of interest;
providing for display of a virtual-reality-content-review-space to a user, the virtual-reality-content-review-space comprising a virtual space in which a virtual reality preview of the at least one instance of virtual reality content is displayed at a location spaced from a point of view of the user, the one or more virtual reality preview comprising the respective sub-volume defined by the context information for providing the user with a view of the virtual reality space around the point of interest.

15. The method of claim 14, wherein the sub-volume comprises an amount of the virtual reality space of one or more instances of virtual reality content to distinguish surroundings of the point of interest in the sub-volume from surroundings of the point of interest in the sub-volume of any other of the one or more instances of virtual reality content.

16. The method of claim 14, wherein the context information is one or more of:
   predefined and associated with the virtual reality content, the context information providing information to define the sub-volume associated with one or more points of interest that feature in said virtual reality content;
   generated from computer content analysis configured to identify the location of the point of interest in said virtual reality space of said instances of virtual reality content and define the sub-volume therearound to provide the user with an understanding of the virtual reality space around the point of interest; or
   generated, at least in part, from user-settings that specify the size of the sub-volume for the point of interest.

17. The method of claim 14, wherein the context information is specific to the point of interest and to its surroundings in the respective instances of virtual reality content.

18. The method of claim 14, wherein the context information defines an associated nearby feature in the virtual reality content, the sub-volume defined such that it includes the point of interest and the associated nearby feature, the associated nearby feature comprising a predetermined feature in the visual imagery of the instance of virtual reality content at a virtual location around said point of interest to provide an indication of the virtual surroundings of the point of interest.

19. The method of claim 14, wherein the one or more instances of virtual reality content comprises search results of a search query, the search query performed on a plurality of instances of virtual reality content that include the one or more instances of virtual reality content, the point of interest comprising the subject of a search query from which said search results were generated.

20. A non-transitory computer readable medium comprising program instructions stored thereon for performing at least the following:
   based on a point of interest being identified in one or more instances of virtual reality content, the one or more instances of virtual reality content comprising at least visual imagery and data to provide a virtual reality space in which the visual imagery is displayed; and
   based on context information for at least one of the one or more instances of the virtual reality content, the context information defining the extent of a virtual sub-volume of the virtual reality space that includes the point of interest;
   provide for display of a virtual-reality-content-review-space to a user, the virtual-reality-content-review-space comprising a virtual space in which a virtual reality preview of the one or more instances of virtual reality content is displayed at a location spaced from a point of view of the user, the one or more virtual reality previews comprising the respective sub-volume defined by the context information for providing the user with a view of the virtual reality space around the point of interest.

* * * * *